Figure 1:
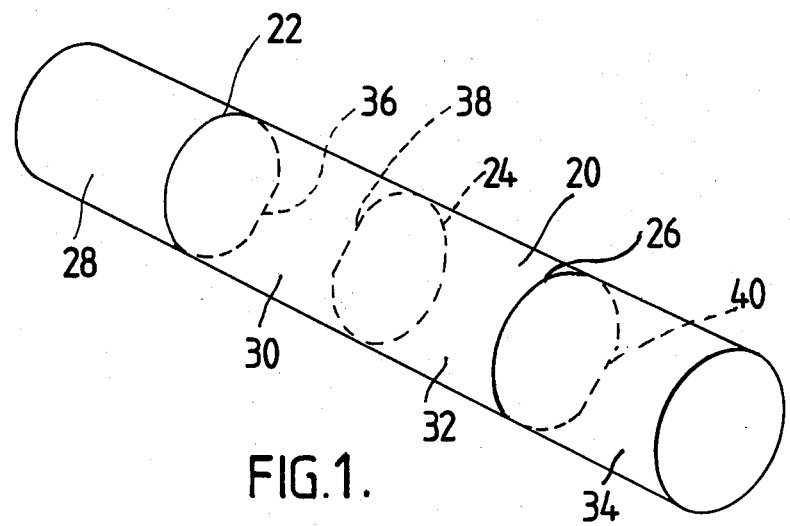

United States Patent [19]

Pivonka

[11] Patent Number: 4,623,545
[45] Date of Patent: Nov. 18, 1986

[54] DOUGH ROLLING METHOD AND APPARATUS WITH AIR-FILM LUBRICATED CHUTE

[75] Inventor: Josef K. Pivonka, Norwich, England

[73] Assignee: Tweedy of Burnley Limited, Burnley, England

[21] Appl. No.: 787,241

[22] Filed: Oct. 15, 1985

[51] Int. Cl.⁴ .............................................. A21C 3/02
[52] U.S. Cl. .................................... 426/502; 425/366
[58] Field of Search .............. 425/366, 373, 374, 363; 426/500–503; 99/353, 355, 450.2, 483; 406/88, 89

[56] References Cited

U.S. PATENT DOCUMENTS

| | | | |
|---|---|---|---|
| 3,411,830 | 11/1968 | Smith | 406/88 |
| 3,411,831 | 11/1968 | Smith | 406/88 |
| 3,603,646 | 9/1971 | Leoff | 406/89 |
| 3,999,806 | 12/1976 | Hurd | 406/88 |
| 4,123,113 | 10/1978 | Koss | 406/88 |
| 4,568,223 | 2/1986 | Lenhart | 406/88 |

FOREIGN PATENT DOCUMENTS 835240 5/1960 United Kingdom .
1120669 7/1968 United Kingdom .
1446314 3/1977 United Kingdom .

Primary Examiner—Willard E. Hoag
Attorney, Agent, or Firm—Richard E. Jenkins

[57] ABSTRACT

The invention is concerned with the compacting and discharging of a dough piece in and from a dough moulding machine. According to one aspect of the invention, the dough piece is passed over a fluidized bed (air-film-lubricated chute) and at the same time, it is squeezed between a pair of rollers having their axes substantially at right angles to the fluidized bed. This method of compacting, is particularly useful in the cross panning of a dough piece.

A second aspect of the invention provides a method of discharging a dough piece from a dough moulder, in which it is delivered on to a downwardly inclined fluidized bed and as it leaves the bottom of the fluidized bed it falls on to a rotating discharge roller so that it is slid forwardly under the action of the discharge roller.

The invention provides apparatus for carrying out both the compacting and discharge methods.

10 Claims, 6 Drawing Figures

DOUGH ROLLING METHOD AND APPARATUS WITH AIR-FILM LUBRICATED CHUTE

At the the discharge end of a moulder/panner as used in a bakery, the moulded dough piece has to be ejected from the machine into a bread tin or on to a conveyor. Frequently, the moulder/panner is equipped with apparatus for compacting the moulded dough piece immediately in advance of the position where the dough is ejected. The present invention provides a method and apparatus for compacting a dough piece before its ejection from a dough moulding machine, and an ejection method and apparatus.

The compacting apparatus is particularly necessary if the moulding machine is adapted to carry out cross-panning, of the dough, in which a dough piece originally in elongate form extending transversely of the machine is partly severed, and then folded about the dough hinge or hinges formed by the severing action, so that the segments of the dough piece separated by the dough hinge(s) then lie longitudinally of the machine.

A well known instance of cross-panning is W-folding, in which an elongated dough piece of cylindrical shape travelling in a direction transverse to its own longitudinal axis is first partly severed at three positions to form three dough hinges and four equal length dough segments, then the dough piece is retarded at the centre dough hinge, so that it adopts a V-formation, and then it is retarded at its ends, so that it adopts a W-formation. It is then necessary to employ some means of compacting the W-form dough piece, so that all four segments lie side by-side and in engagement with each other. A known method of achieving compaction of a W-formation dough piece is to carry it forwardly on a conveyor and to cause its ends to be engaged by a pair of side conveyors travelling at approximately the same speed as the conveyor on which the dough piece is carried, the side conveyors converging, so that as the dough piece travels in engagement with them, it is compressed. The action of the side conveyors first closes the W-form dough piece on itself, and then squeezes the four segments together.

One of the problems associated with the production of modern soft doughs, which incorporate a high level of liquid (water or liquid fats and sugar—glucose) is that the dough pieces are very easily deformed, partly because they are very soft and partly because they readily adhere to any surface with which they engage. It has been found that the use of side conveyors as a means of compacting cross-panned dough pieces sometimes produces deformation of the dough piece. It is an object of the present invention to provide a method and apparatus for compacting a dough piece which has a reduced tendency to distort the dough piece.

According to a first aspect of the invention a method of compacting a dough piece in a dough moulding machine comprises: passing the dough piece over a fluidised bed and at the same time squeezing it between a pair of rollers having their axes disposed substantially at right angles to the fluidised bed.

A fluidised bed is a plate having a number of perforations through which streams of fluid are caused to issue, the arrangement being such that when a dough piece falls on to the plate, the escaping streams of fluid under the dough piece unite and form a fluid film between the plate and the dough piece. In practice, a fluidised bed will virtually prevent contact between the dough and the plate, so that the dough piece is effectively floating on the film of fluid. There may be occasional and localised contact between the dough piece and the plate, but the overall effect is that of the dough floating on a film of fluid without contacting the plate itself. The fluid used for the film may be a liquid, which would have no deleterious effect on the dough piece, such as water or certain oils, but it is preferred to use a gaseous fluid, and in the preferred method, the fluid is air.

The invention relies on a combination of two factors, namely the fluidised bed, which ensures that the dough piece is floating at the position where compating occurs, and the use of rollers to effect compaction, which ensures that there is minimum contact between the compressing device (rollers) and the dough piece. It is preferred that the dough piece is caused to travel by gravity over the fluidised bed.

Preferably the dough piece is transferred straight from the fluidised bed to the surface of a transfer roller, which tips the dough piece into a waiting bread tin or on to a discharge conveyor. This has proved to be a particularly effective means of discharging the dough piece from the moulder, and indeed could be employed even if there were no compacting of the dough piece, as appears from the third and fourth aspects of the invention.

According to a second aspect of the invention a dough moulder is provided with a downwardly inclined fluidised bed arranged to receive a moulded dough piece, and a pair of compacting rollers disposed above the fluidised bed and with their axes substantially at 90° to the surface of the fluidised bed, so that a dough piece sliding downwardly over the fluidised bed can be compressed between the compacting rollers.

Preferably each of the compacting rollers is suspended from a mounting bracket disposed over the fluidised bed, and is driven by a shaft extending cantilever fashion from the mounting bracket. Each compacting roller may conveniently have its own driving motor and speed reduction gearing also carried by the mounting bracket.

The fluidised bed may comprise a continuation of a fluidised bed which forms part of a dough folding apparatus, for example as described in the specification of United Kingdom Patent Application No: 8420829 (now UK Pat. No. 2,163,086A) published 2-19-1986.

According to a third aspect of the invention a method of discharging a dough piece from a dough moulding machine comprises the steps of: delivering the dough piece on to a downwardly inclined fluidised bed, and delivering the dough piece as it leaves the bottom of the fluidised bed on to the surface of a rotating discharge roller where that surface is commencing to move downwardly, so that the dough piece is slid forwardly under the action of the discharge roller and at the same time falls under gravity into a bread tin or on to a conveyor.

According to a fourth aspect of the invention a dough moulding machine is provided with a dough piece discharge mechanism comprising a downwardly inclined fluidised bed, with its lower end arranged above and closely adjacent to the surface of a discharge roller mounted for rotation about a generally horizontal axis, at a position where that surface is beginning a downward motion as the roller rotates.

Figure 2:
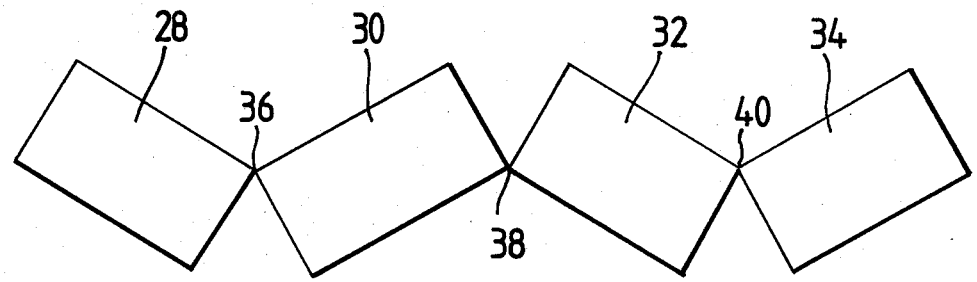
Figure 3:
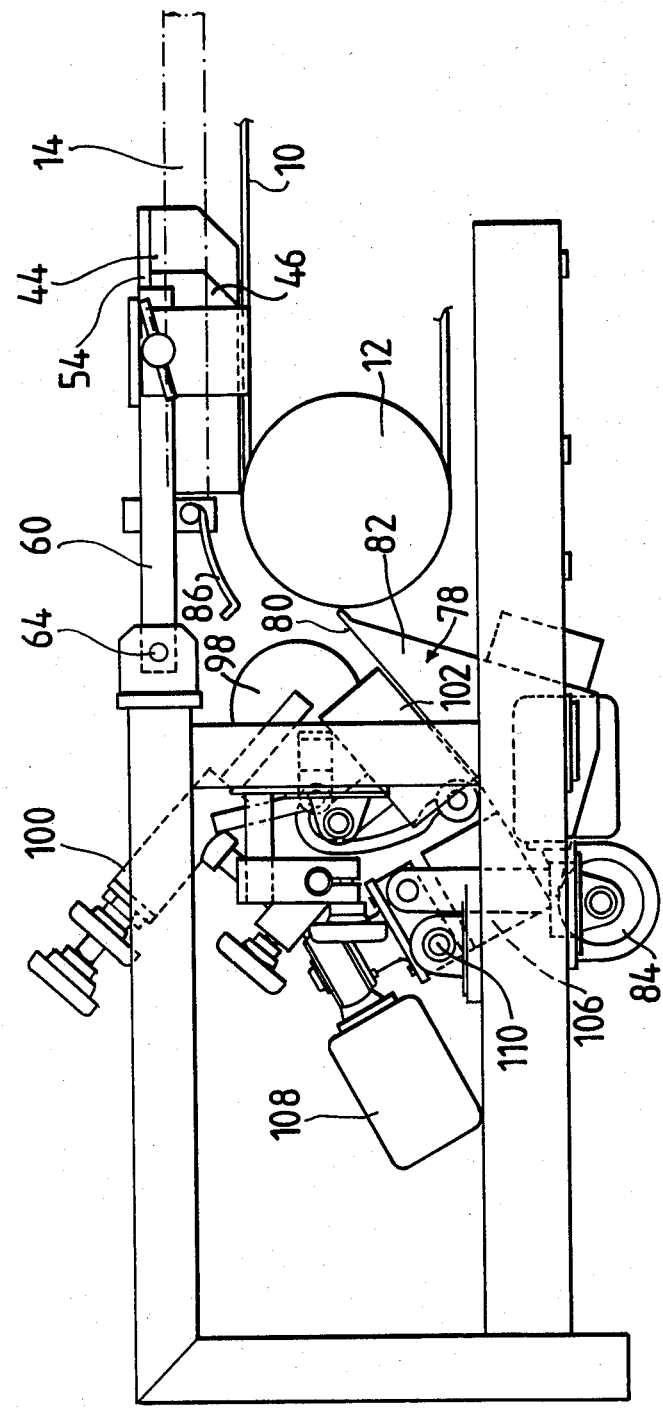
Figure 4:
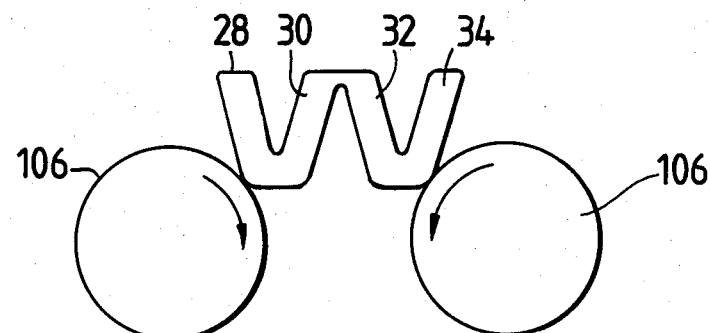
Figure 5:
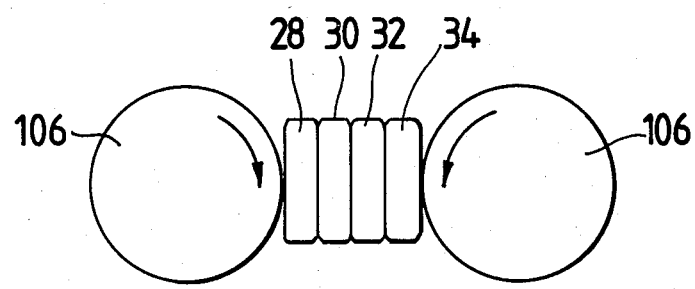
Figure 6:
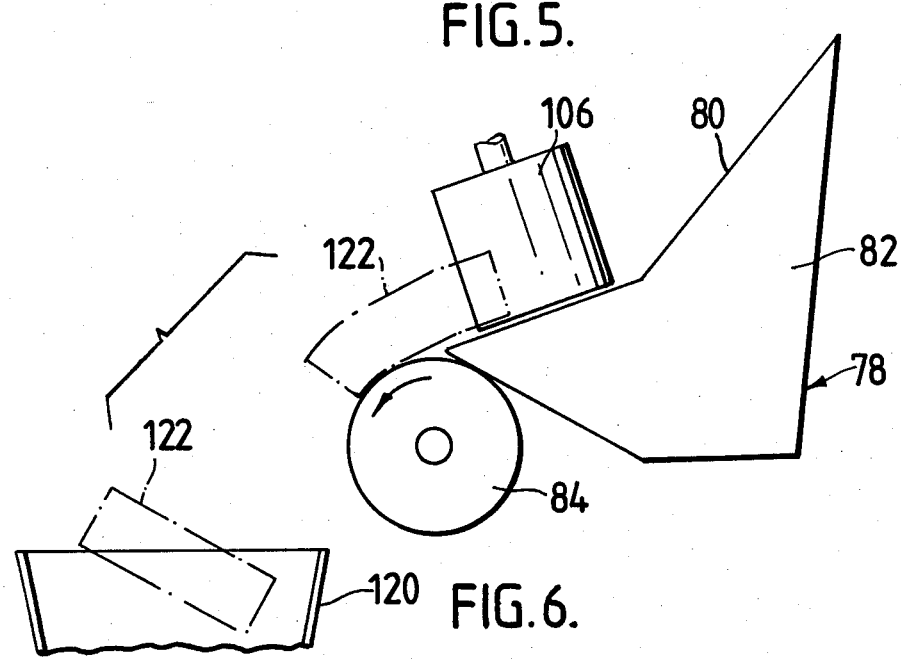

The construction and method of operation of apparatus at the discharge end of a moulder/panner machine will now be described to exemplify the various aspects and preferred features of the invention. In the accompanying drawings:

FIG. 1 is a diagrammatic perspective view of a dough piece after it has been coiled, compacted and partly severed on the moulder/panner machine, FIG. 2 is a diagrammatic plan view of the dough piece shown in FIG. 1 part way through a folding process, FIG. 3 is a side view of the discharge end of a moulder/panner, FIG. 4 is a diagrammatic view showing the operation of a pair of compacting rollers at one stage in that operation, FIG. 5 is a view similar to FIG. 4, but showing a later stage in the operation, and FIG. 6 is a detail side view to a larger scale of part of the apparatus shown in FIG. 3.

The apparatus which is illustrated in FIGS. 3, 4, 5 and 6 of the drawings constitutes the discharge or panner end of a moulder/panner, which is generally of conventional construction. Such a moulder/panner has a set of sheeting rollers at the front end of the machine (not shown) which receive pieces of dough divided from a dough mass, and roll out each piece of dough into a flat thin sheet. After leaving the sheeting rollers, the flat sheet of dough is delivered on to the top horizontal run of a conveyor comprising a belt 10 passed around front and rear rollers rotating about horizontal axes, of which only the rear roller 12 is shown in FIG. 3. The conveyor is of appreciable length, and at the front end (not shown) there is a coiler, which usually takes the form of a chain mail sheet draped over the conveyor. As the sheet of dough passes under the chain mail coiler, it is first rotated on itself by the interaction of the forwardly moving top run of the conveyor belt 10, and the stationary chain mail coiler, and it then passes under a stationary pressure board 14, which extends along the length of the top run of the conveyor belt 10, and is spaced closely above the conveyor. As the loosely rolled piece of dough travels on the conveyor belt, it rolls in contact with the undersurface of the pressure board 14, and this has the effect of tightening or compacting the roll on itself, so that at the discharge end of the conveyor belt, where the dough piece comes out of the nip between the top run of the conveyor belt and the pressure board 14, the dough piece is constituted into a quite tightly rolled cylinder. At the exit end of the conveyor, the cylindrical piece of dough has to be delivered into a baking tin, for subsequent conveying to the oven for baking. This is the panner end of the moulder/panner machine, and the present invention relates to the panner or discharge end of the machine.

The moulder/panner is fitted with an arrangement, whereby it is adapted to produce so-called W-folding of the dough piece, which is illustrated diagrammatically in FIGS. 1 and 2 of the drawings. The dough piece 20 is slit at three equally spaced locations 22, 24 and 26 so that it is divided into four portions 28, 30, 32 and 34 of approximately equal length. The slits 22, 24 and 26 do not extend completely through the cylindrical dough piece, so that effective dough "hinges" 36, 38 and 40 are formed between adjacent portions of dough. It will be observed, particularly from FIG. 2, that whereas the dough hinge 38 is at the front side of the dough piece, the dough hinges 36 and 40 are at the rear side of the dough piece, that is to say, the side hinges 36 and 40 are diametrically opposite to the centre hinge 38, having regard to the cylindrical shape of the entire dough piece.

During its motion through the panner/moulder, the cylindrical dough piece has a translatory motion in a direction at right angles to its own longitudinal axis. If during that motion, the dough piece encounters an obstruction adjacent to the centre hinge 38, then the portions of dough on opposite sides of the centre hinge 38 will fold into a V-formation, with the ends in advance of the centre, and the slit 24 at the centre will open up as shown at the centre of FIG. 2. If subsequently, the end portions 28 and 34 encounter obstructions, then they will be retarded in their translational forward motion, and the slits 22 and 26 will open up, so that the four dough portions 28, 30, 32 and 34 adopt a W-formation as illustrated in FIG. 2. It will be appreciated, that if the dough piece moves forward from the position illustrated in FIG. 2, whilst there is still an obstruction at the centre in engagement with the hinge 38, and inwardly directed compressive forces are applied to the end portions 28 and 34, then eventually, the four dough portions 28, 30, 32 and 34 will be turned so that they lie with their individual longitudinal axes parallel to each other, and extending in the direction of translational forward motion. Further compressive force applied to the ends of the dough piece will cause these four portions to be squashed together, and effectively united. However, by turning the four dough portions through 90° during the forward motion, the grain of the coiled dough piece which previously extended transversely of the machine, will now extend longitudinally of the machine, in four separate regions of the complete dough piece.

The method of slitting and folding the dough illustrated in FIGS. 1 and 2, and described above, is conventional, and is referred to as W folding. It is in fact quite frequently used in the manufacture of loaves, because it has proved advantageous to divide the single cylinder of dough into four portions, and then turn them through 90° as described.

A set of three slitting blades of which only the blades 44 and 46 are visible in FIG. 3 is employed, for the purpose of creating the slits 22, 24 and 26 in dough pieces passing through the moulder/panner. It will be apparent that as the dough piece passes under the blades, the latter cut into the dough piece to form the three laterally spaced slits. In fact, the three blades have to be set relatively to each other so that the dough hinge 38 is diametrically opposite the dough hinges 36 and 40.

A slitting blade mounting plate 54 is carried by a pair of arms 60 pivoted at 64, on a fixed part of the machine frame.

To the rear of the conveyor 10, there is a fluidised bed arrangement 78 which comprises a surface plate 80 carried by a plenum chamber 82 (see also FIG. 6). The plate 80 extends across the effective width of the machine, and is inclined downwardly and rearwardly as clearly shown in FIGS. 3 and 6. Furthermore, at its upper front end, it lies closely adjacent to the surface of the belt 10, where the belt passes around the rear guide roller 12. A series of small holes is formed in the inclined plate 80, and these holes are arranged in ranks and files, so as to cover the entire effective area of the plate 80. In a typical arrangement, the holes may be each 0.062 inches diameter, and evenly spaced from each other at approximately half inch centres, in both the longitudinal and lateral directions. A compressor (not shown) is connected to the plenum chamber 78, for the purpose of supplying air under pressure to the plenum chamber. Consequently, the air from the compressor has to escape from the plenum chamber through the multiplicity of small holes in the surface plate 80. This provides a typical fluidised bed arrangement, because when a dough piece falling from the conveyor arrives on the inclined plate 80, the air streams issuing from the plate under the dough piece unite to form a film of air on which the dough piece floats. It will be appreciated, that in any case, the dough piece will tend to slide down the surface plate 80, but with very soft doughs, there is sometimes a tendency for the dough piece to stick on any guide plate provided, and in any case, a soft dough piece can easily be deformed by impact on the plate. However, the fluidised bed arrangement, preventing physical engagement between the dough piece and the plate, prevents the dough piece sticking to the plate, and also minimises the danger of deformation due to impact. The lower end of the guide plate 80 provides a less steep slope than the upper end and terminates adjacent to a discharge roller 84 which is arranged on the underside of the panner, above the position at which the baking tins 120 are presented one at a time to receive the dough pieces discharged from the moulder/panner. This roller 84 is rotated slowly by driving means not illustrated.

A guide plate 86 made of sheet steel is provided adjacent to the rear end of the pressure board 14, and this plate 86 is located over the path of the conveyor belt 10, as it descends around part of the periphery of the rear guide roller 12. The plate 86 extends across the effective width of the machine, and is secured at its forward end to a rod, which also extends across the width of the machine, and which is journalled in bearings (not shown) at each side of the machine, so that it is possible to turn the plate 86 about the longitudinal axis of the rod. The guide plate 86 can be tilted away from the rear guide roller 12, by turning it about the axis of the rod, but this movement is resisted by a spring loading (not shown).

The curvature of the guide plate 86 is such, that in the ordinary operative position, illustrated in FIG. 3, it is substantially concentric with the guide roller 12, and therefore with the path of the conveyor belt 10 passing over the guide roller. Moreover, the gap between the belt 10 and the underside of the guide plate 86 is approximately equal to the depth of the gap between the upper run of the conveyor belt 10 and the underside of the pressure plate 14. Hence, when a dough piece in cylindrical form is emerging from the gap between the conveyor and the pressure board, it engages with the underside of the guide plate 86, which therefore forms an effective extension of the pressure board, at least so far as the guiding and controlling effect of the pressure board is concerned. Therefore, the guide plate 86 holds the dough piece during the critical period when it is out of the control of the pressure board, and is moving from a horizontal path into a downwardly sloping path and produces a continued turning of the dough piece about its own longitudinal axis whilst the dough piece is passing in engagement with the guide plate. At the same time, the resilient loading of the guide plate 86 will allow the plate to yield slightly if necessary, to allow the dough piece to pass without applying a force to the dough piece sufficient to cause distortion.

A central retarding disc 98 is carried by a pneumatic cylinder 100 fixed on the machine frame, and adapted to project the retarding disc 98 into the position shown in FIG. 3, but to permit upward withdrawal of the retarding disc 98 away from the surface plate 80 is required. The disc 98 forms a first part of a folding apparatus and its purpose is to engage with the dough piece as it begins to slide over the fluidised bed 78, in the region of the central dough hinge 38, thereby retarding the dough piece at the centre, and causing the dough piece to bend into a V-formation.

At each side of the fluidised bed 78, there is a stationary manipulator 102 which also forms part of the folding apparatus. Each of these manipulators has an inner wall, which is perpendicular to the surface plate 80, but inclined inwardly and downwardly. In other words, the inner walls of the two manipulators 102 converge towards the bottom end of the manipulators. The lateral position of the manipulators 102 is such that they engage with the ends of the dough piece, as the latter is sliding over the fluidised bed 78, and retard the end portions 28 and 34, so that in combination with the central retarding disc 98, they produce the W-formation of the dough piece. The arrangement is such, that the formation of the W commences at the top of the manipulators 102, and by the time the dough piece is passing out through the bottom ends of the manipulators, its four portions 28, 38, 32 and 34 are inclined to each other at quite acute angles—i.e. each dough piece has been turned through the major part of 90°.

In some instances, each of the manipulators 102 may itself take the form of a fluidised bed, with the inclined inner wall being perforated to provide a fluidised surface for "engagement" with the dough piece. In that case, the manipulator 102 will be of box like form, and the box will in fact be the plenum chamber of the fluidised bed arrangement. If the manipulators 102 are fluidised, then they can be connected to the same source of air under pressure as that used for the fluidised bed 78.

Finally, the particular folding mechanism illustrated includes a pair of rotary manipulators 106 positioned beyond the exit from the stationary manipulators 102, and over the discharge roller 84. Each of the rotary manipulators 106 takes the form of a roller, mounted for rotation about an axis which is substantially perpendicular to the surface plate 80, and each of the rotary manipulators 106 is driven by a geared electric motor 108. In fact, each sub-assembly comprising one of the rotary manipulators 106 together with its driving motor 108 and the reduction gearing between the motor and the rotary manipulator, is mounted for adjustment about an axis 110. The purpose of the rotary manipulators is to squeeze the four small dough pieces together to complete the folding process, and to guide it on to the discharge roller 84.

The method of operation of the manipulators 106 and the discharge roller 84 is illustrated in FIGS. 4, 5 and 6. Referring to FIG. 4, this illustrates the position, when the dough piece in a W-formation with the small pieces 28, 30, 32 and 34 in acute angled relationship to each other is just beginning to engage with the inner surfaces of the manipulators 106. It will be observed, that these inner surfaces are moving in the same direction, and that the gap between the manipulators 106 is narrower than the overall width of the W-formation dough piece. Consequently, as the dough piece slides over the fluidised bed and passes with its ends in engagement with the manipulators 106, the latter squeeze the dough piece, closing up the W-formation, until the four small pieces 28, 30, 32 and 34 lie in abutting side by-side relationship, as illustrated in FIG. 5. Indeed, the gap between the manipulators 106 is preferably so arranged that the dough pieces are squeezed together in the parallel side-by-side arrangement, so that they become united into a single dough piece, in which the grain lies at right angles to the original direction of the grain in the elongate cylinder of dough. In this condition, the re-orientated dough piece is ready for ejection from the machine into a bread tin.

It is important to note, that during the completion of the folding operation, the dough piece is floating on the fluidised bed, and the manipulators 106 exercise a gentle stroking and compressing action, so that there is little danger of distortion of the dough.

There is a slight slowing down of the rate of travel of the dough piece as it passes over the lower part of the fluidised bed 80, because that part is not so steeply inclined as the upper part. Then as the dough piece emerges from the manipulators 106, and slides off the lower end of the fluidised bed 80, it engages immediately on the surface of the discharge roller 84, at a position where that surface is commencing its downward motion. Consequently, the dough piece begins to curl around the discharge roller 84, and eventually, the discharge roller flicks over the dough piece, as illustrated in chain-dotted lines at 122 in FIG. 6, so that it falls neatly into a bread tin 120.

It is to be understood, that the fluidised bed arrangement 78 and the discharge roller 84, would operate as an efficient method of discharging dough pieces from the moulder/panner machine, even if the machine were not equipped with a W-forming apparatus, and even if there were no manipulators 106. Equally, the dough compacting arrangement comprising the fluidised bed arrangement 78 and the rotary manipulators 106, could be employed with an alternative means of feeding the compacted dough piece from the moulder/panner machine into bread tins. It will also be appreciated, that instead of discharging the dough pieces from the machine into bread tins, they could be delivered on to a conveyor for subsequent processing.

I claim:

1. A method of compacting a dough piece in a dough moulding machine comprising: passing the dough piece over a fluidised bed and at the same time squeezing said dough piece between a pair of rollers having their axes disposed substantially at right angles to said fluidised bed.

2. A method of compacting a dough piece according to claim 1, wherein said fluid is gaseous.

3. A method of compacting a dough piece according to claim 1, wherein said fluid is air.

4. A method of compacting a dough piece according to claim 1, wherein the dough piece is transferred straight from said fluidised bed to the surface of a transfer roller, which tips the dough piece into a waiting bread tin or on to a discharge conveyor.

5. A dough moulder comprising a downwardly inclined fluidised bed arranged to receive a moulded dough piece, and a pair of compacting rollers disposed above said fluidised bed and with their axes substantially at 90° to the surface of said fluidised bed, so that a dough piece sliding downwardly over said fluidised bed can be compressed between said compacting rollers.

6. A dough moulder according to claim 5, wherein each of said compacting rollers is suspended from a mounting bracket disposed over said fluidised bed, and is driven by a shaft extending cantilever fashion from said mounting bracket.

7. A dough moulder according to claim 6, wherein each compacting roller has its own driving motor and speed reduction gearing also carried by said mounting bracket.

8. A method of discharging a dough piece from a dough moulding machine comprising the steps of: delivering the dough piece on to a downwardly inclined fluidised bed, and delivering the dough piece as it leaves the bottom of the fluidised bed on to the surface of a rotating discharge roller where that surface is commencing to move downwardly, so that the dough piece is slid forwardly under the action of the discharge roller and at the same time falls under gravity into a bread tin or on to a conveyor.

9. A method of discharging a dough piece according to claim 8, wherein the fluid is gaseous.

10. A dough moulding machine provided with a dough piece discharge mechanism comprising a downwardly inclined fluidised bed, with its lower end arranged above and closely adjacent to the surface of a discharge roller mounted for rotation about a generally horizontal axis, at a position where that surface is beginning a downward motion as the roller rotates.

* * * * *